United States Patent
Suzuki et al.

(10) Patent No.: US 7,305,900 B2
(45) Date of Patent: Dec. 11, 2007

(54) TWIN-CLUTCH TRANSMISSION

(75) Inventors: Osamu Suzuki, Saitama (JP); Akihiko Tomoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 286 days.

(21) Appl. No.: 11/088,873

(22) Filed: Mar. 25, 2005

(65) Prior Publication Data
US 2005/0211007 A1    Sep. 29, 2005

(30) Foreign Application Priority Data
Mar. 25, 2004    (JP) ............................. 2004-090163

(51) Int. Cl.
*F16H 3/38* (2006.01)
*F16H 3/08* (2006.01)

(52) U.S. Cl. .......................... 74/340; 74/329

(58) Field of Classification Search ................. 74/329, 74/330, 331, 340
See application file for complete search history.

(56) References Cited

U.S. PATENT DOCUMENTS

| | | | |
|---|---|---|---|
| 4,485,687 A * | 12/1984 | Burke et al. ................... | 74/358 |
| 5,890,392 A | 4/1999 | Ludanek et al. | |
| 6,244,123 B1 * | 6/2001 | Hegerath et al. ............. | 74/325 |
| 6,931,956 B2 * | 8/2005 | Thery .......................... | 74/325 |
| 7,082,850 B2 * | 8/2006 | Hughes ........................ | 74/329 |

FOREIGN PATENT DOCUMENTS

| | | |
|---|---|---|
| FR | 88 466 E | 2/1967 |
| GB | 2 186 333 A | 8/1987 |
| GB | 0 469 451 A | 2/1992 |
| GB | 1 122 116 A2 | 8/2001 |
| KR | 2005043495 * | 9/2005 |

* cited by examiner

*Primary Examiner*—Roger Pang
(74) *Attorney, Agent, or Firm*—Birch, Stewart, Kolasch & Birch, LLP

(57) ABSTRACT

A twin-clutch transmission wherein a center distance between input shafts and an auxiliary speed-change shaft can be shortened and the number of gears can be reduced. A twin-clutch transmission is provided which includes a first input shaft and a second input shaft, an auxiliary speed-change shaft, and a plurality of gear pairs. The first and second input shaft are connected, through a first clutch and a second clutch, respectively, to an input element, and disposed on the same axis. The auxiliary speed-change shaft is disposed parallel to the first and second input shafts. The plurality of gear pairs are provided between the first and second input shafts and the auxiliary speed-change shaft. An input path from the input element to the first clutch is different from that to the second clutch, and primary ratios of the input paths are set to values, respectively, different from each other.

19 Claims, 5 Drawing Sheets

TWIN-CLUTCH TRANSMISSION

BACKGROUND OF THE INVENTION

CROSS-REFERENCE TO RELATED APPLICATIONS

The present application claims priority under 35 USC 119 to Japanese Patent Application No. 2004-090163 filed on Mar. 25, 2004 the entire contents of which are hereby incorporated by reference.

1. Field of the Invention

The present invention relates generally to a twin-clutch transmission having two clutches that are selectively used to direct power from an input element to the transmission.

2. Description of Background Art

Various types of such twin-clutch transmissions have been proposed, as disclosed in U.S. Pat. No. 5,890,392.

In the twin-clutch transmission disclosed in U.S. Pat. No. 5,890,392, two clutches that are provided as input parts have a common clutch cage to which rotation of a crankshaft is transmitted. Two input shafts are concentrically connected to the common clutch cage via respective friction plates. One of the two input shafts surrounds the other.

Six gear pairs for a first speed to a sixth speed are provided between the two input shafts and an auxiliary speed-change shaft is disposed parallel to the two input shafts.

The two clutches are selectively engaged. More specifically, they are controlled such that when one of them is engaged, the other is disengaged.

One of the two clutches is selectively engaged. An input shaft connected to the engaged clutch and the auxiliary speed-change shaft are allowed to interlock through the meshing engagement of a required gear pair. This achieves a required speed change ratio.

As described above, since the two clutches share the clutch cage, each primary ratio obtained when power is transmitted to each of the two input shaft is the same. In other words, either input shaft is rotated at the same speed of rotation.

Of the gear pairs provided between the input shafts and the auxiliary speed-change shaft that are disposed parallel with the input shafts, a gearwheel on the side of the auxiliary speed-change shaft for a first speed-reduction gear pair has the largest diameter. The first speed gear ratio substantially determines the center distance between the input shafts and the auxiliary speed-change shaft.

If the first input shaft carries a gear pair for the first speed, then the second input shaft carries a gear pair for the second speed. Since the first input shaft extends through the inside of the second input shaft, the gearwheel for the second speed carried on the second input shaft is increased in diameter according to the increased diameter of the second input shaft. As a result, the center distance between the gear pair for the second speed is greater than that for the first speed.

In addition, since a gear pair cannot be used for another speed, the number of gearwheels cannot be reduced.

SUMMARY AND OBJECTS OF THE INVENTION

The present invention has been made in view of the foregoing and it is one object of the invention to provide a twin-clutch transmission capable of being reduced in size and weight by shortening the center distance between input shafts and an auxiliary speed-change shaft or by reducing the number of gearwheels.

To achieve the above object, the present invention provides a twin-clutch transmission including a first input shaft and a second input shaft connected, through a first clutch and a second clutch, respectively, to an input element, and disposed on the same axis. An auxiliary speed-change shaft is disposed parallel to the first and second input shafts with a plurality of gear pairs provided between the first and second input shafts and the auxiliary speed-change shaft. One of the first and second clutches is selectively engaged while the other is disengaged, and one of the first and second input shafts that is coupled to the corresponding one of the first and second clutches is interlocked with the auxiliary speed-change shaft through engagement of a required one of the plurality of gear pairs, thereby achieving a required speed change ratio. An input path from the input element to the first clutch is different from that to the second clutch, and primary ratios of the input paths are set to values, respectively, that are different from each other.

The input path from the input element to the first clutch is different from that to the second clutch. A second speed ratio is achieved by use of a first speed gear pair and second primary driving and driven gears.

Thus, it is not necessary to provide a second gear pair on a second input shaft, so that a center distance is not increased.

In addition, the present invention provides a twin-clutch transmission including a first input shaft and a second input shaft connected, through a first clutch and a second clutch, respectively, to an input element, and disposed on the same axis. An auxiliary speed-change shaft is disposed parallel to the first and second input shafts with a plurality of gear pairs provided between the first and second input shafts and the auxiliary speed-change shaft. One of the first and second clutches is selectively engaged while the other is disengaged, and one of the first and second input shafts that is coupled to the corresponding one of the first and second clutches is interlocked with the auxiliary speed-change shaft through engagement of a required one of the plurality of gear pairs, thereby achieving a required speed-change ratio. A third clutch means is provided between the first input shaft and the second input shaft so that engagement and disengagement of the third clutch means may make it possible and impossible, respectively, to transmit power between the first input shaft and the second input shaft.

Since the clutch means is provided between the first input shaft and the second input shaft, one and the same gear pair can selectively transmits the rotation of the first input shaft and that of the second input shaft. It can be used for two speed-change gearing. Thus, the number of gears can be reduced, thereby providing the small-sized and lightweight transmission.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
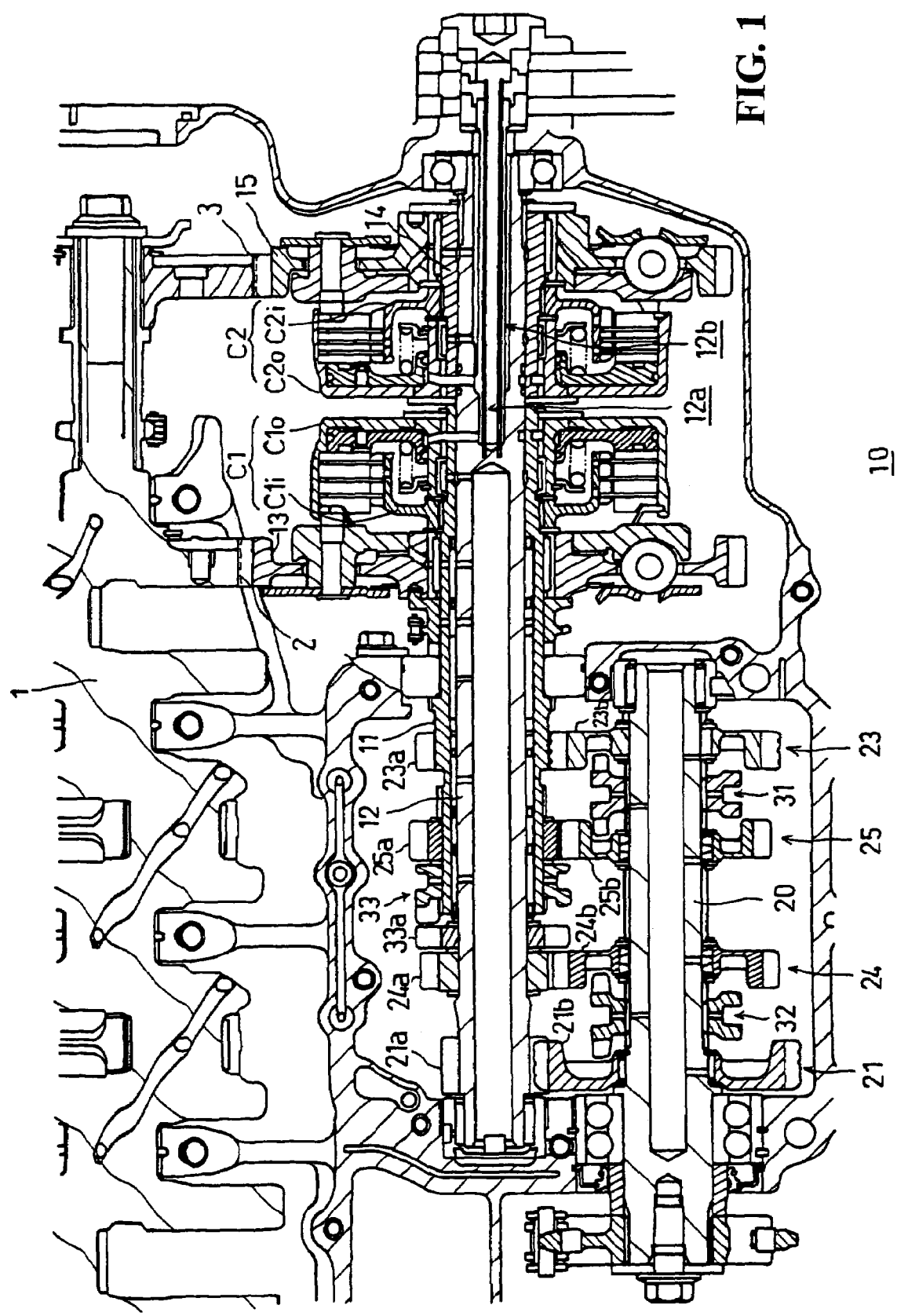
FIG. 1 is a cross-sectional view of a twin-clutch transmission according to an embodiment of the present invention.

A preferred embodiment of the present invention is described below with reference to FIGS. 1 to 8.

A twin-clutch transmission 10 of the embodiment is configured such that a first input shaft 11 and a second input shaft 12 are coaxially nested with respected to one another and a crankshaft 1 and an auxiliary speed-change shaft 20 are disposed parallel to the first and second input shafts 11 and 12.

Referring to FIG. 1, the first input shaft 11 is partially carried on the outer surface of the second input shaft 12 in such a manner that both the input shafts are rotatable with respect to each other. A first clutch C1 is provided at the right end of the first input shaft 11 while a second clutch C2 is provided at a portion of the second input shaft 12 spaced to the right from the first input shaft 11. The first and second clutches C1 and C2 are disposed parallel to each other.

The clutch inner C1i of the first clutch C1 is integrally spline-fitted to the first input shaft 11. The clutch outer C1o of the first clutch C1 is connected to a first primary driven gear 13 rotatably carried on the first input shaft 11.

The clutch inner C2i of the second clutch C2 is integrally provided on the second input shaft 12 via an intermediate sleeve 14. The clutch outer C2o of the second clutch C2 is connected to a second primary driven gear 15 rotatably carried on the second input shaft 12.

The first and second clutches C1 and C2 are hydraulic clutches. The first clutch C1 is adapted to receive a hydraulic pressure applied through an oil path 12a bored along the central axis of the second input shaft 12. The second clutch C2 is adapted to receive a hydraulic pressure applied through another oil path 12b made on the outer circumference of the oil path 12a.

The oil paths 12a and 12b are each connected to a hydraulic circuit through a tip of the second input shaft 12. The first and second clutches are controlled such that when one of the clutches is pressurized and thereby engaged, the other is depressurized and thereby disengaged.

A first primary driving gear 2 is formed on the outer circumference of the most rightward web of the crankshaft 1. The first primary driving gear 2 is in mesh with the first primary driven gear 13. A second primary driving gear 3 is integrally spline-fitted to the right end portion of the crankshaft 1. The second primary driving gear 3 is in mesh with the second primary driven gear 15.

Since the first primary driven gear 13 is greater in diameter than the second primary driven gear 15, the primary ratio of the input path from the crankshaft 1 to the first clutch C1 is greater than that from the crankshaft 1 to the clutch C2. The first input shaft 11 engaged with the first clutch C1 for rotation, therefore, provides a greater speed-reducing ratio than the second input shaft 12 engaged with the second clutch C2 for rotation.

A third speed driving gear 23a and a fifth/sixth speed driving gear 25a are fixedly secured to the first input shaft 11. A third speed driven gear 23b and a fifth/sixth speed driven gear 25b are rotatably carried on the auxiliary speed-change shaft 20. The third speed driving gear 23a and the fifth/sixth speed driving gear 25a are in mesh with the third speed driven gear 23b and the fifth/sixth speed driven gear 25b, respectively. In other words, the third speed speed-reduction gear pair 23 (23a, 23b) and the fifth/sixth speed speed-reduction gear pair 25 (25a, 25b) are configured between the first input shaft 11 and the auxiliary speed-change shaft 20.

A first/second speed driving gear 21a and a fourth speed driving gear 24a are fixedly secured to a portion, leftwardly extending from the first input shaft 11, of the second input shaft 12. A first/second speed driven gear 21b and a fourth speed driven gear 24b are rotatably carried on the auxiliary speed-change shaft 20. The first/second speed driving gear 21a and the fourth speed driving gear 24a are in mesh with the first/second speed driven gear 21b and the fourth speed driven gear 24b, respectively. In other words, the first/second speed speed-reduction gear pair 21 (21a, 21b) and the fourth speed speed-reduction gear pair 24 (24a, 24b) are configured between the second input shaft 12 and the auxiliary speed-change shaft 20.

The first/second speed speed-reduction gear pair 21, the third speed speed-reduction gear pair 23, the fourth speed speed-reduction gear pair 24, and the fifth/sixth speed speed-reduction gear pair 25 are smaller in speed-change ratio in this order. Thus, they provide smaller speed-reducing ratios in this order. Consequently, the first/second speed driven gear 21b has the largest diameter.

A dog clutch 31 is slidably spline-fitted to the auxiliary speed-change shaft 20 between the fifth/sixth speed driven gear 25b and the third speed driven gear 23b. In FIG. 1, when the dog clutch 31 is slidably displaced to the right, and engaged with the third driven gear 23b, the rotation of the first input shaft 11 is reduced in speed by and transmitted through the third speed speed-reduction gear pair 23 to the auxiliary speed-change shaft 20. When the dog clutch 31 is slidably displace to the left, and engaged with the fifth/sixth speed driven gear 25b, the rotation of the first input shaft 11 is reduced in speed by and transmitted through the fifth/sixth speed speed-reduction gear pair 25 to the auxiliary speed-change shaft 20. When the dog clutch 31 is located at the intermediate position, it is engaged with neither of the driven gears 23b nor 25b. The rotation of the first input shaft 11 is, therefore, not transmitted to the shift auxiliary shaft 20 through the third speed speed-reduction gear pair 23 or the fifth/sixth speed speed-reduction gear pair 25.

A dog clutch 32 is slidably spline-fitted to the auxiliary speed-change shaft 20 between the first/second speed driven gear 21b and the fourth speed driven gear 24b. In FIG. 1, when the dog clutch 32 is slidably displaced to the left, and engaged with the first/second speed driven gear 21b, the rotation of the second input shaft 12 is reduced in speed by and transmitted through the first/second speed speed-reduction gear pair 21 to the auxiliary speed-change shaft 20. When the dog clutch 32 is slidably displace to the right, and engaged with the fourth speed driven gear 24b, the rotation of the second input shaft 12 is reduced in speed by and transmitted through the fourth speed speed-reduction gear pair 24 to the auxiliary speed-change shaft 20. When the dog clutch 32 is located at the intermediate position, it is engaged with neither of the driven gears 21b nor 24b. The rotation of the second input shaft 12 is, therefore, not transmitted to the shift auxiliary shaft 20 through the first/second speed speed-reduction gear pair 21 or the fourth speed speed-reduction gear pair 24.

A dog clutch 33 is slidably spline-fitted to the left end portion of the first input shaft 11. A dog receiver 33a together with the fourth driving shaft 24a is fixedly fitted to the second input shaft 12 in such a manner so as to face the dog clutch 33. The dog clutch 33 is slidably displaced to the left and engaged with the dog receiver 33a, which causes the first and second input shafts 11 and 12 to be integrally rotated. The dog clutch 33 is slidably displaced to the right and disengaged from the dog receiver 33a, which causes the first and second input shaft 11, 12 to be independently rotated.

The abovementioned three dog clutches 31, 32, and 33 are axially and slidably displaced by corresponding shift forks (not shown) which are actuated through the rotation of a shift drum by automatically controlled actuators.

Figure 2:
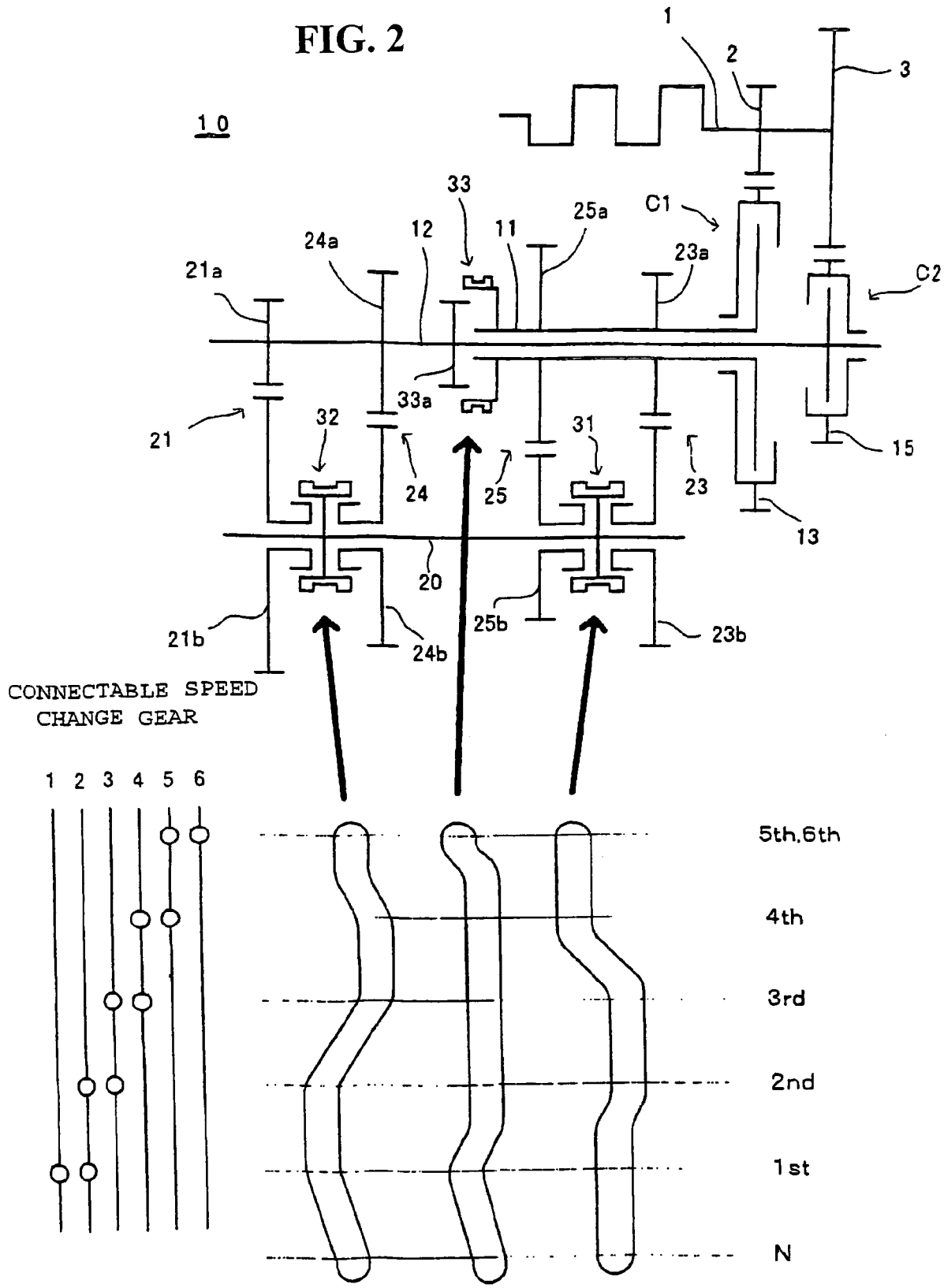
FIG. 2 includes a skeleton diagram illustrating the twin-clutch transmission, a development of the shift drum, and a diagram illustrating states of meshing gears.

FIG. 2 includes a skeleton diagram illustrating the twin-clutch transmission 10, a development of the shift drum, and a diagram illustrating states of meshing gears.

A description is set forth below of the operation of upshifting the speed change gear from the neutral state to the sixth forward gear.

When the speed change gear is in the neutral state, the dog clutches 31 and 32 are each in the intermediate position and the four driven gears 21b, 23b, 24b, and 25b are each in a free state. Consequently, power is not transmitted to the auxiliary speed-change shaft 20.

In addition, the dog clutch 33 is displaced to the right so that the first input shaft 11 and the second input shaft 12 are independent of each other.

Further, the first clutch C1 and the second clutch C2 are each in a disengaged state.

When the shift drum is rotated to a stage to bring a shift into the first speed, the dog clutch 32 is slidably displaced to the left and engaged with the first/second speed driven gear 21b, thereby enabling power to be transmitted to the auxiliary speed-change shaft 20. At the same time, the dog clutch 33 is slidably displaced to the left, thereby causing the first and second input shafts 11 and 12 to be rotatably and integrally connected to each other.

Then, the first clutch C1 is engaged, and the vehicle starts moving in the first speed.

Figure 3:
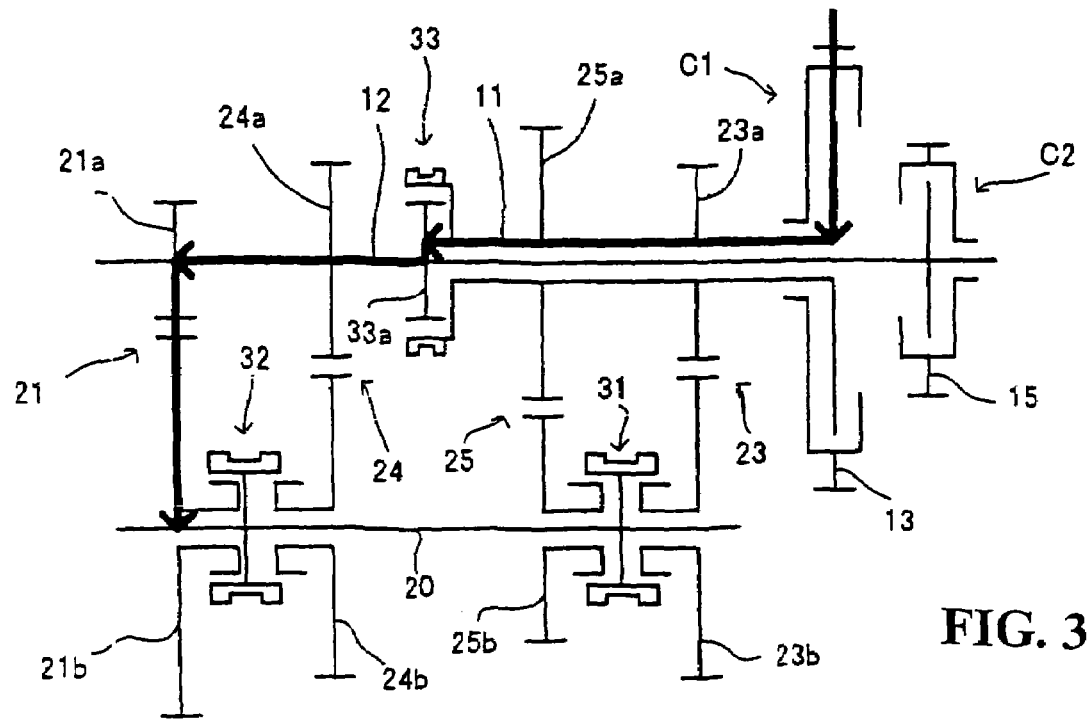
FIG. 3 is a skeleton diagram illustrating the state of the first speed of the twin-clutch transmission.

FIG. 3 shows the state of the first speed.

The rotation of the first input shaft 11 is reduced in speed relatively largely through the first clutch C1. The rotation of the first input shaft 11 is then transmitted to the second input shaft 12 via the dog clutch 33. The rotation is further reduced in speed via the first/second speed gear pair 21 and transmitted to the auxiliary speed-change shaft 20. This provides the first speed state in which the auxiliary speed-change shaft 20 is rotated at the maximumly reduced speed.

When the transmission is shifted up to the second speed, first of all, the first clutch C1 is disengaged and the second clutch C2 is engaged. Immediately after this operation, the dog clutch 33 is slidably displaced to the right to disconnect the first input shaft 11 from the second input shaft 12. A little later, the dog clutch 31 is slidably displaced and engaged with the third speed driven gear 23b.

Figure 4:
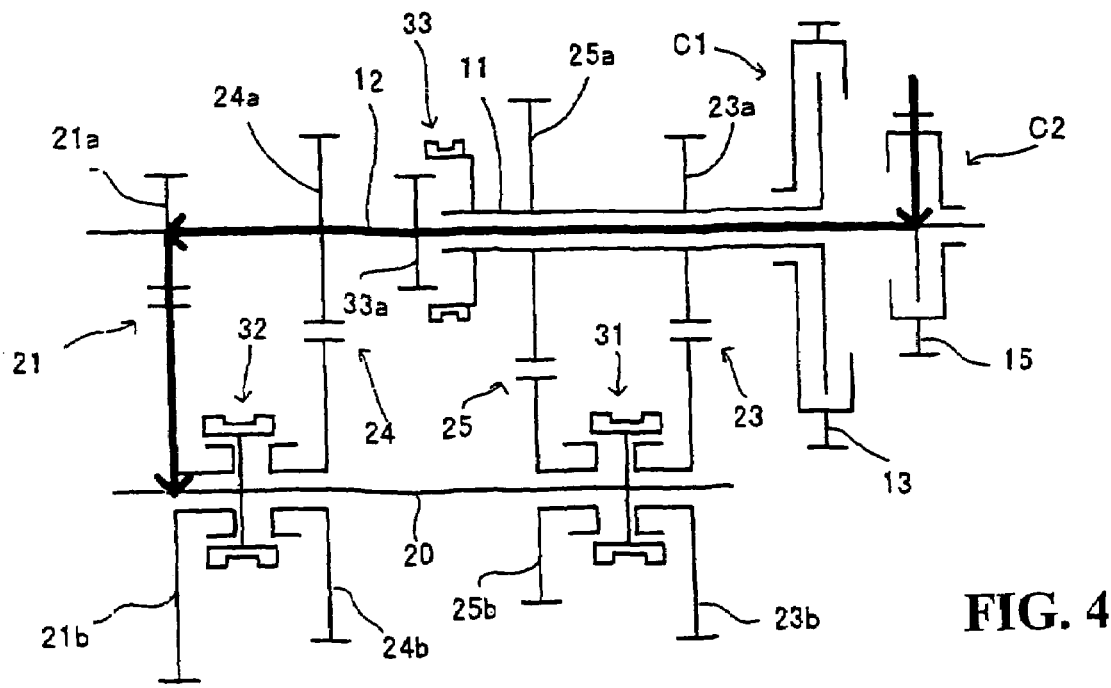
FIG. 4 is a skeleton diagram illustrating the state of the second speed of the twin-clutch transmission.

FIG. 4 shows the state of the second speed.

The rotation of the second input shaft 12 is reduced in speed at a relatively small level through the second clutch C2. The rotation of the second input shaft 12 is further reduced in speed via the first/second speed gear pair 21 and transmitted to the auxiliary speed-change shaft 20. Thus, smooth upshift to the second speed state is achieved.

Incidentally, the engagement of the dog clutch 31 with the third speed driven gear 23b is executed to prepare an upshift to the third speed.

When upshift to the third speed is executed, the second clutch C2 is disengaged and the first clutch C1 is engaged. Immediately after this operation, the dog clutch 32 is slidably displaced to the right and disengaged from the first/second speed driven gear 21b before it is engaged with the fourth driven gear 24b.

Figure 5:
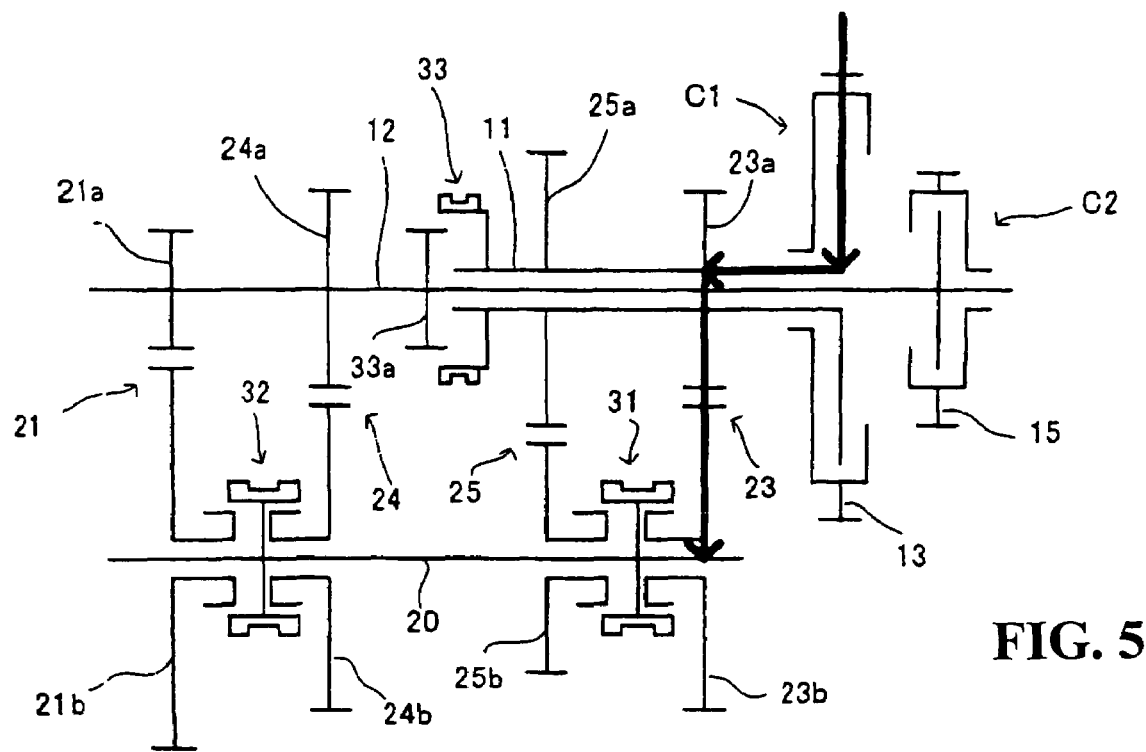
FIG. 5 is a skeleton diagram illustrating the state of the third speed of the twin-clutch transmission.

FIG. 5 shows the state of the third speed.

The rotation of the first input shaft 11 is reduced in speed in a relatively large range through the engagement of the first clutch C1. The rotation of the first input shaft 11 is further reduced in speed via the third speed gear pair 23 whose third speed driven gear 23b has already been engaged with the dog clutch 31, and is transmitted to the auxiliary speed-change shaft 20. Thus, smooth upshift to the third speed state is achieved.

When upshift to the fourth speed is executed, the first clutch C1 is disengaged and the second clutch C2 is engaged. Thereafter, the dog clutch 31 is slidably displaced to the left so as to be disengaged from the third driven gear 23b, and is engaged with the fifth/sixth speed driven gear 25b.

Figure 6:
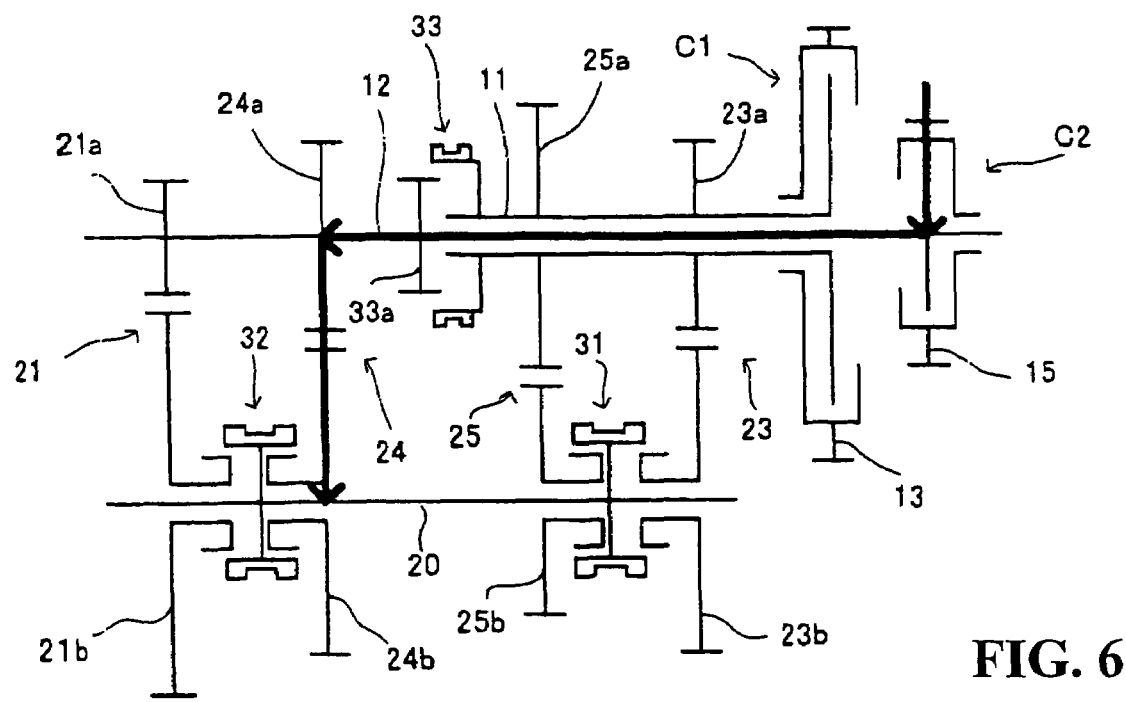
FIG. 6 is a skeleton diagram illustrating the state of the fourth speed of the twin-clutch transmission.

FIG. 6 shows the state of the fourth speed.

The rotation of the second input shaft 12 is reduced in speed in a relatively small range through the second clutch C2. The rotation of the second input shaft 12 is further reduced in speed via the fourth speed gear pairs 24, which has previously been engaged with the dog clutch 32, and transmitted to the auxiliary speed-change shaft 20. Thus, a smooth upshift to the fourth speed state is achieved.

When upshift to the fifth speed is executed, the second clutch C2 is disengaged and the first clutch C1 is engaged. Immediately after this operation, the dog clutch 32 is slidably displaced to the left so as to be disengaged from the fourth driven gear 24b, being located at the neutral position. Thereafter, the dog clutch 33 is slidably displaced to the right so as to couple the first input shaft 11 with the second input shaft 12.

Figure 7:
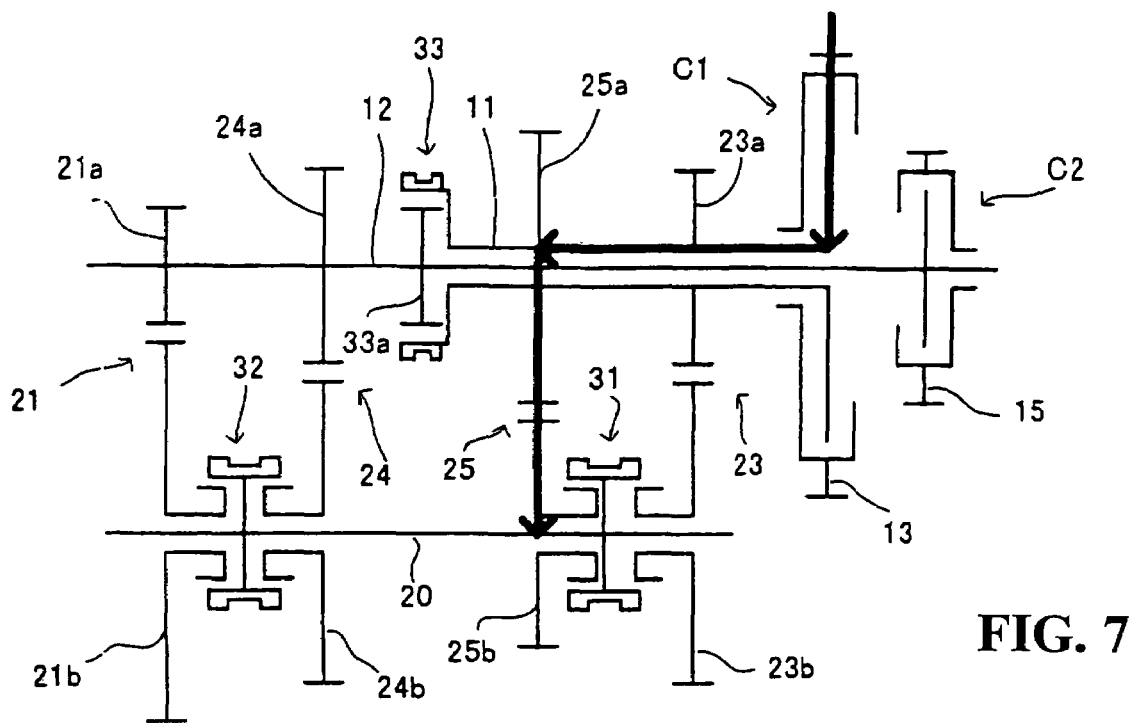
FIG. 7 is a skeleton diagram illustrating the state of the fifth speed of the twin-clutch transmission.

FIG. 7 shows the state of the fifth speed.

The rotation of the first input shaft 11 is reduced in speed in a relatively great range through the engagement of the first clutch C1. The rotation of the first input shaft 11 is further reduced in speed through the fifth/sixth speed gear pair 25 whose fifth/sixth speed driven gear 25b has previously engaged with the dog clutch 31, and transmitted to the auxiliary speed-change shaft 20. Thus, the upshift to the fifth speed state is achieved.

When upshift to the sixth speed is executed, it is needed only to disengage the first clutch C1 and engage the second clutch C2.

Figure 8:
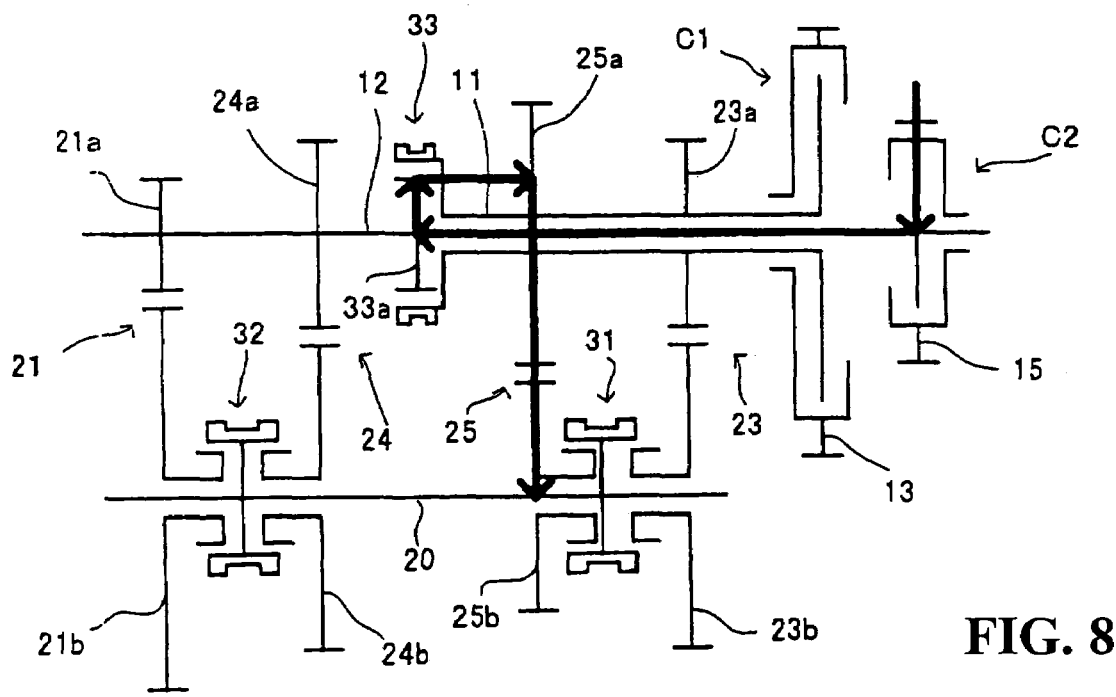
FIG. 8 is a skeleton diagram illustrating the state of the sixth speed of the twin-clutch transmission.

FIG. 8 shows the state of the sixth speed.

The rotation of the second input shaft 12 is reduced in speed in a relatively small range through the second clutch C2. The rotation of the second input shaft 12 is transmitted to the first input shaft 11 through the dog clutch 33, which has been previously engaged. The rotation of the first input shaft 11 is reduced in speed through the fifth/sixth speed gear pair 25, and transmitted to the auxiliary speed-change shaft 20. Thus, a smooth upshift to the sixth speed state is achieved.

As describe above, in the twin-clutch transmission 10, a required dog clutch is prepared for engagement or disengagement in a certain speed before a selected speed to be upshifted and then the upshift to the selected speed is executed by engaging the first clutch C1 and the second clutch C2 alternately. Thus, the smooth upshifting can be achieved.

Downshift to a certain speed can be achieved by the operation reverse to the upshifting operation.

More specifically, when downshift to the fifth speed is executed, it is needed only to disengage the second clutch C2 and engage the first clutch C1.

Referring to FIGS. 6 and 7, when downshift to the fourth speed is executed, the dog clutch 33 is slidably displaced to the left to disengage the first input shaft 11 from the second input shaft 12, and almost concurrently, the dog clutch 32 is slidably displaced to the right and engaged with the fourth speed driven gear 24b. Then the first clutch C1 is disengaged and the second clutch C2 is engaged, whereby the fourth speed state can be achieved.

In this way, if the downshift is executed, a required dog clutch is prepared for engagement or disengagement before the first clutch C1 and the second clutch C2 are each engaged alternately, whereby the downshifting is executed. Thus, a smooth downshift can be achieved.

In the twin-clutch transmission 10, the primary ratio of the input path from the crankshaft 1 to the first clutch C1 through the meshing engagement of the first primary driving gear 2 with the first primary driven gear 13 is set to be greater than that to the second clutch C2 through the meshing engagement of the second primary driving gear 3 with the second primary driven gear 15.

The second input shaft 12 is rotated integral with the first input shaft 11 coupled to the first clutch C1, which is placed on the input path having the greater primary ratio. In addition, the first/second speed gear pair 21 is disposed between the second input shaft 12 and the auxiliary speed-change shaft 20. Thus, the first/second speed driven gear 21b having the largest diameter can be reduced in diameter, thereby shortening the center distance between the first and second input shafts and the auxiliary speed-change shaft.

Shortening the center distance can reduce the diameters of the gears of the gear pairs, serving to provide the small-sized and lightweight transmission.

In addition, the first/second speed driving gear 21a of the first/second speed gear pair 21 is not fixedly fitted to the first input shaft 11 having a larger diameter but to the second input shaft 12 having a smaller diameter. Therefore, the first/second speed driven gear 21b can be slightly increased in diameter. Thus, the center distance can be reduced while the increased reduction ratio of the first/second speed gear pair can be ensured.

The dog clutch 33 is provided between the first input shaft 11 and the second input shaft 12, so that power transmission can be enabled or disabled between the first input shaft 11 and the second input shaft 12. A gear pair shared by two speed-change gearings can, therefore, be used. The two speed-change gearings include e.g. the first/second speed gear pair 21 and the fifth/sixth speed gear pair 25, wherein either rotation of the first input shaft 11 or that of the second input shaft 12 can be transmitted to the auxiliary speed-change shaft 20. Thus, the number of gears can be reduced, thereby providing a small-sized and lightweight transmission.

In the embodiment described above, the first clutch C1 is disposed adjacent to the second clutch C2 and the first input shaft 11 concentrically embraces the second input shaft 12. Alternatively, the following configuration may be adopted. The first input shaft 11 and the second input shaft 12 are not be embraced with respect each other, but are disposed concentrically to each other. A clutch means is disposed between the first input shaft 11 and the second input shaft 12, and at the opposite ends thereof the first clutch C1 and the second clutch C2 are disposed, respectively.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A twin-clutch transmission comprising:
 a first input shaft and a second input shaft connected, through a first clutch and a second clutch, respectively, to an input element, and disposed on the same axis;
 an auxiliary speed-change shaft disposed parallel to the first and second input shafts; and
 a plurality of gear pairs provided between the first and second input shafts and the auxiliary speed-change shaft;
 wherein one of the first and second clutches is selectively engaged while the other is disengaged, and one of the first and second input shafts that is coupled to the corresponding one of the first and second clutches is interlocked with the auxiliary speed-change shaft through engagement of a required one of the plurality of gear pairs, thereby achieving a required speed-change ratio;
 wherein an input path from the input element to the first clutch is different from that to the second clutch, and primary ratios of the input paths are set to values, respectively, different from each other,
 wherein a sixth gear pair is operatively connected to the first input shaft, and
 wherein a dog clutch is operatively positioned between the first and second input shafts for selectively causing the first and second input shafts to be integrally rotated for transmitting rotation from said second clutch to the second input shaft and to the first input shaft and to the sixth gear pair for a sixth speed.

2. The twin-clutch transmission according to claim 1, wherein a first gear pair is operatively connected to the second input shaft, and the dog clutch is operatively positioned between the first and second input shafts for selectively causing the first and second input shafts to be integrally rotated for transmitting rotation from said first clutch to the first input shaft to the second input shaft and to the first gear pair for a first speed.

3. The twin-clutch transmission according to claim 1, wherein a second gear pair is operatively connected to the second input shaft, and the dog clutch is operatively positioned between the first and second input shafts for selectively causing the first and second input shafts to be disengaged from rotating together for transmitting rotation from said second clutch to the second input shaft and to the second gear pair for a second speed.

4. The twin-clutch transmission according to claim 1, wherein a third gear pair is operatively connected to the first input shaft, and the dog clutch is operatively positioned between the first and second input shafts for selectively causing the first and second input shafts to be disengaged from rotating together for transmitting rotation from said first clutch to the first input shaft and to the third gear pair for a third speed.

5. The twin-clutch transmission according to claim 1, wherein a fourth gear pair is operatively connected to the second input shaft, and the dog clutch is operatively positioned between the first and second input shafts for selectively causing the first and second input shafts to be disengaged from rotating together for transmitting rotation from said second clutch to the second input shaft and to the fourth gear pair for a fourth speed.

6. The twin-clutch transmission according to claim 1, wherein a fifth gear pair is operatively connected to the first input shaft, and the dog clutch is operatively positioned between the first and second input shafts for selectively causing the first and second input shafts to be disengaged from rotating together for transmitting rotation from said first clutch to the first input shaft and to the sixth gear pair for a fifth speed.

7. The twin-clutch transmission according to claim 4, and further including a second dog clutch for selectively causing the auxiliary speed-change shaft to be engaged with the third gear pair.

8. The twin-clutch transmission according to claim 7, wherein said second dog clutch selectively causes said auxiliary speed-change shaft to be engaged with the fifth gear pair.

9. The twin-clutch transmission according to claim 5, and further including a third dog clutch for selectively causing the auxiliary speed-change shaft to be engaged with the fourth gear pair.

10. A twin-clutch transmission comprising:
a first input shaft and a second input shaft connected, through a first clutch and a second clutch, respectively, to an input element, and disposed on the same axis;
an auxiliary speed-change shaft disposed parallel to the first and second input shafts; and
a plurality of gear pairs provided between the first and second input shafts and the auxiliary speed-change shaft;
wherein one of the first and second clutches is selectively engaged while the other is disengaged, and one of the first and second input shafts that is coupled to the corresponding one of the first and second clutches is interlocked with the auxiliary speed-change shaft though engagement of a required one of the plurality of gear pairs, thereby achieving a required speed-change ratio; and
wherein a third clutch means is provided between the first input shaft and the second input shaft so that engagement and disengagement of the third clutch means may make it possible and impossible, respectively, to transmit power between the first input shaft and the second input shaft,
wherein a sixth gear pair is operatively connected to the first input shaft and wherein the third clutch means is operatively positioned between the first and second input shafts for selectively causing the first and second input shafts to be integrally rotated for transmitting rotation from said second clutch to the second input shaft and to the first input shaft and to the sixth gear pair for a sixth speed.

11. The twin-clutch transmission according to claim 10, wherein a first gear pair is operatively connected to the second input shaft and wherein the third clutch means is operatively positioned between the first and second input shafts for selectively causing the first and second input shafts to be integrally rotated for transmitting rotation from said first clutch to the first input shaft to the second input shaft and to the first gear pair for a first speed.

12. The twin-clutch transmission according to claim 10, wherein a second gear pair is operatively connected to the second input shaft and wherein the third clutch means is operatively positioned between the first and second input shafts for selectively causing the first and second input shafts to be disengaged from rotating together for transmitting rotation from said second clutch to the second input shaft and to the second gear pair for a second speed.

13. The twin-clutch transmission according to claim 10, wherein a third gear pair is operatively connected to the first input shaft and wherein the third clutch means is operatively positioned between the first and second input shafts for selectively causing the first and second input shafts to be disengaged from rotating together for transmitting rotation from said first clutch to the first input shaft and to the third gear pair for a third speed.

14. The twin-clutch transmission according to claim 10, wherein a fourth gear pair is operatively connected to the second input shaft and wherein the third clutch means is operatively positioned between the first and second input shafts for selectively causing the first and second input shafts to be disengaged from rotating together for transmitting rotation from said second clutch to the second input shaft and to the fourth gear pair for a fourth speed.

15. The twin-clutch transmission according to claim 10, wherein a fifth gear pair is operatively connected to the first input shaft and wherein the third clutch means is operatively positioned between the first and second input shafts for selectively causing the first and second input shafts to be disengaged from rotating together for transmitting rotation from said first clutch to the first input shaft and to the sixth gear pair for a fifth speed.

16. The twin-clutch transmission according to claim 13, and further including a fourth clutch for selectively causing the auxiliary speed-change shaft to be engaged with the third gear pair.

17. The twin-clutch transmission according to claim 16, wherein said fourth clutch selectively causes said auxiliary speed-change shaft to be engaged with the fifth gear pair.

18. The twin-clutch transmission according to claim 14, and further including a fifth clutch for selectively causing the auxiliary speed-change shaft to be engaged with the fourth gear pair.

19. A twin-clutch transmission comprising:
a first input shaft and a second input shaft connected, through a first clutch and a second clutch, respectively, to an input element, and disposed on the same axis;
a dog clutch operatively positioned between the first and second input shafts for selectively causing the first and second input shafts to be disengaged from rotating together;
an auxiliary speed-change shaft disposed parallel to the first and second input shafts; and
four gear pairs provided between the first and second input shafts and the auxiliary speed-change shaft;

wherein one of the first and second clutches is selectively engaged while the other is disengaged, and one of the first and second input shafts that is coupled to the corresponding one of the first and second clutches is interlocked with the auxiliary speed-change shaft through engagement of a required one of the four gear pairs, thereby achieving a required speed-change ratio; and wherein an input path from the input element to the first clutch is different from that to the second clutch, and primary ratios of the input paths are set to values, respectively, different from each other, wherein the required one of gear pairs is the same for each of a first and second speed, with a change only in a status of the dog clutch, wherein the required one of gear pairs is the same for each of a fifth and sixth speed, with a change only in a status of the dog clutch, the required gear pair for the first and second speed being different from the required gear pair for the fifth and sixth speed.

\* \* \* \* \*